INVENTOR
Paul H. Schweitzer
BY
HIS ATTORNEYS

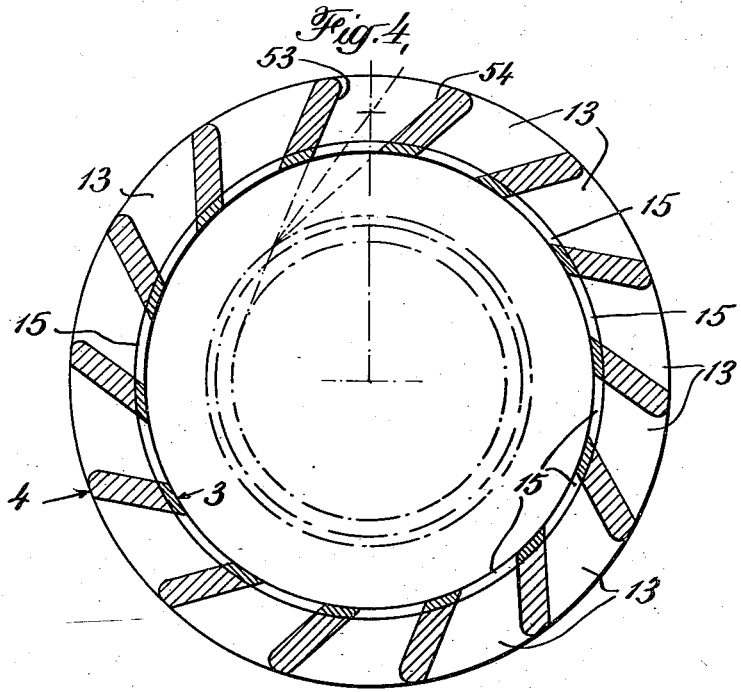
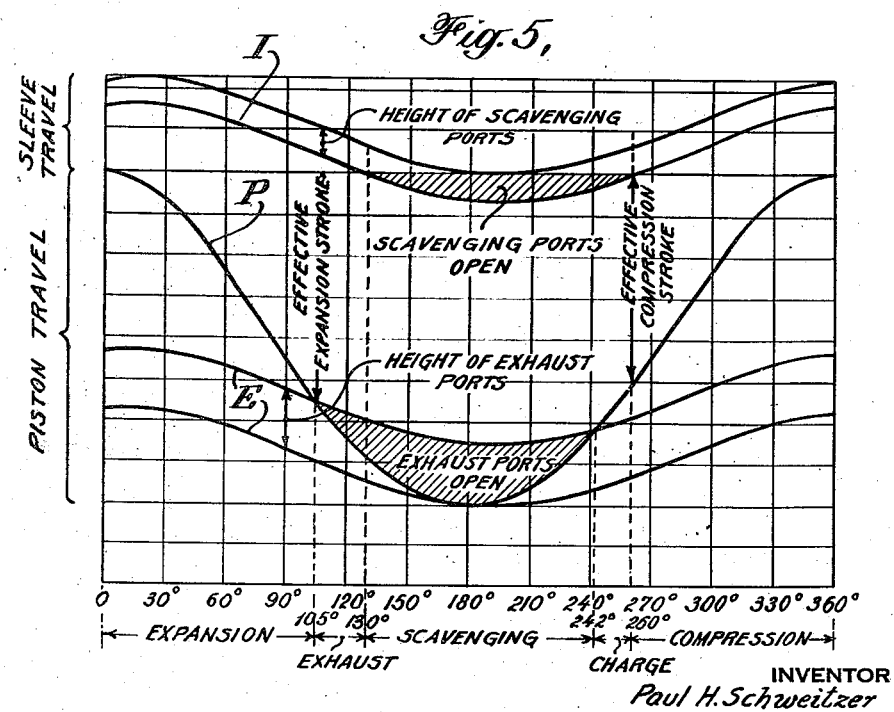

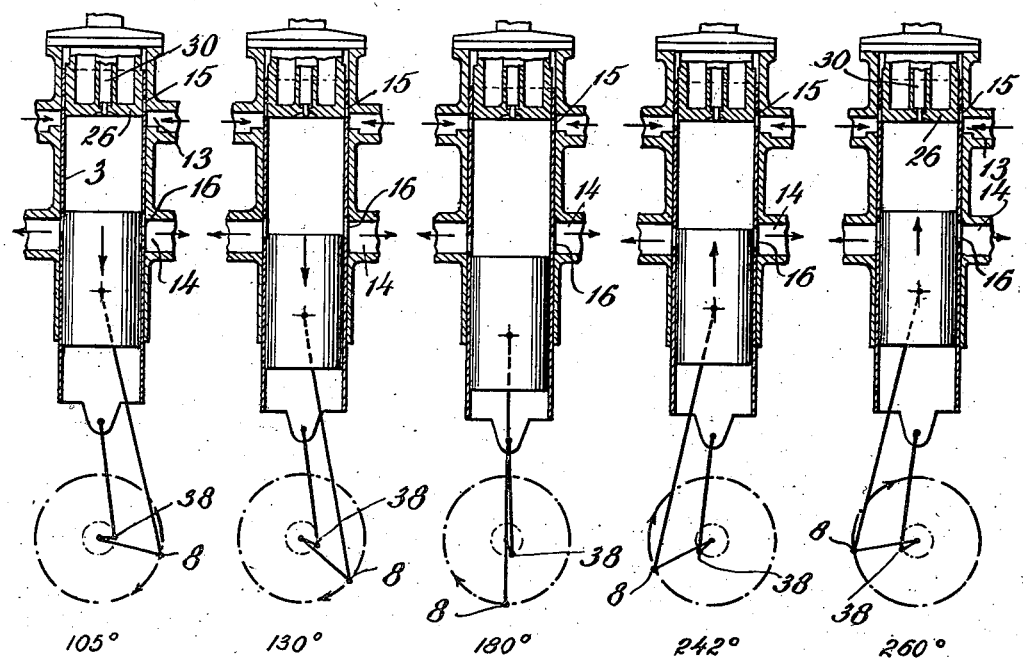
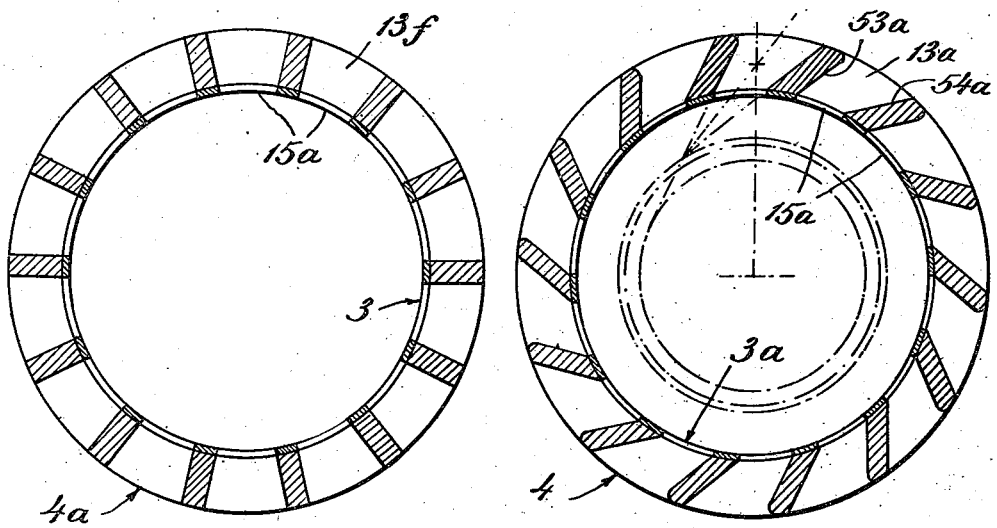

Patented July 21, 1942

2,290,212

UNITED STATES PATENT OFFICE 2,290,212

INTERNAL COMBUSTION ENGINE

Paul H. Schweitzer, State College, Pa., assignor to Martin Motors, Inc., New York, N. Y., a corporation of Delaware Application February 17, 1939, Serial No. 256,888

6 Claims. (Cl. 123—32)

This invention relates to internal combustion engines of the two-stroke cycle type, and more especially to internal combustion engines of the compression ignition, or Diesel, type in which ignition is produced by the heat of compression, and which use liquid fuel injected into the engine cylinder in the form of a spray. The invention is directed to the provision of an engine of this kind of generally improved construction and having unusually high power output per unit of fuel consumed.

Better intermixing of the fuel spray and air has been sought heretofore in various ways. One such way is through producing turbulence, or agitation, of the charge of air within the cylinder during the injection of the fuel. Difficulty, however, has been experienced in providing effective means for producing such turbulence. The combustion chamber has been given various shapes for the purpose of producing a displacement or shifting of the compressed charge of air just prior to and during the fuel injection period. This manner of obtaining a better mixture of fuel and air is associated with high pumping and cooling losses, resulting in poorer fuel economy and less power.

Turbulence has also been produced by effecting a turbulent flow of air into the cylinder during the scavenging and charging periods, particularly the latter, but difficulty has been experienced because of the fact that at the commencement of the compression period the forces tending to produce turbulence cease and forces are set up which tend to destroy the turbulent motion of the air within the cylinder. One of the objects of the invention is, accordingly, to provide for the persistence of the turbulent motion of the air within the cylinder after the commencement of compression to such an extent as to produce especially effective intermixing of the air and fuel spray during the injection period.

Another factor tending to reduce the fuel economy of internal combustion engines, particularly two-stroke cycle engines, is incomplete scavenging, and a further object of the invention is to displace the burned gases from the cylinder in such a manner as to prevent substantial contamination of the fresh charge of air with the burned gases.

Another object of the invention is to produce turbulence in the charge of air within the cylinder of such a nature and under such conditions that upon the injection of the fuel spray a mixture is produced which burns to substantially complete combustion, the turbulence having been produced under conditions which do not promote substantial contamination of the charging air with the burned gases. To obtain high power output per unit of fuel consumed, it is important so far as possible to avoid producing turbulence or agitation during the scavenging period, and to produce the highest possible turbulence within the cylinder during the period of fuel injection. This is difficult of attainment, yet the engine of the present invention produces this result to a remarkable degree.

The invention will be understood by considering the following description in connection with the accompanying drawings which illustrate, by way of example, one embodiment of my improved engine together with two modifications of certain parts of the engine. In these drawings:

Fig. 4 is a horizontal or transverse section of one of the cylinders showing the arrangement of the air admission ports, and may be considered as taken on line 4—4 of Fig. 1 but with the moving parts of the engine shifted to a position where these ports are open;

Fig. 5 is a diagram showing the various phases of the engine cycle, that is to say, "expansion," "exhaust," "scavenging," "charging" and "compression," in relation to the angular position of the engine crank;

Figure 1:
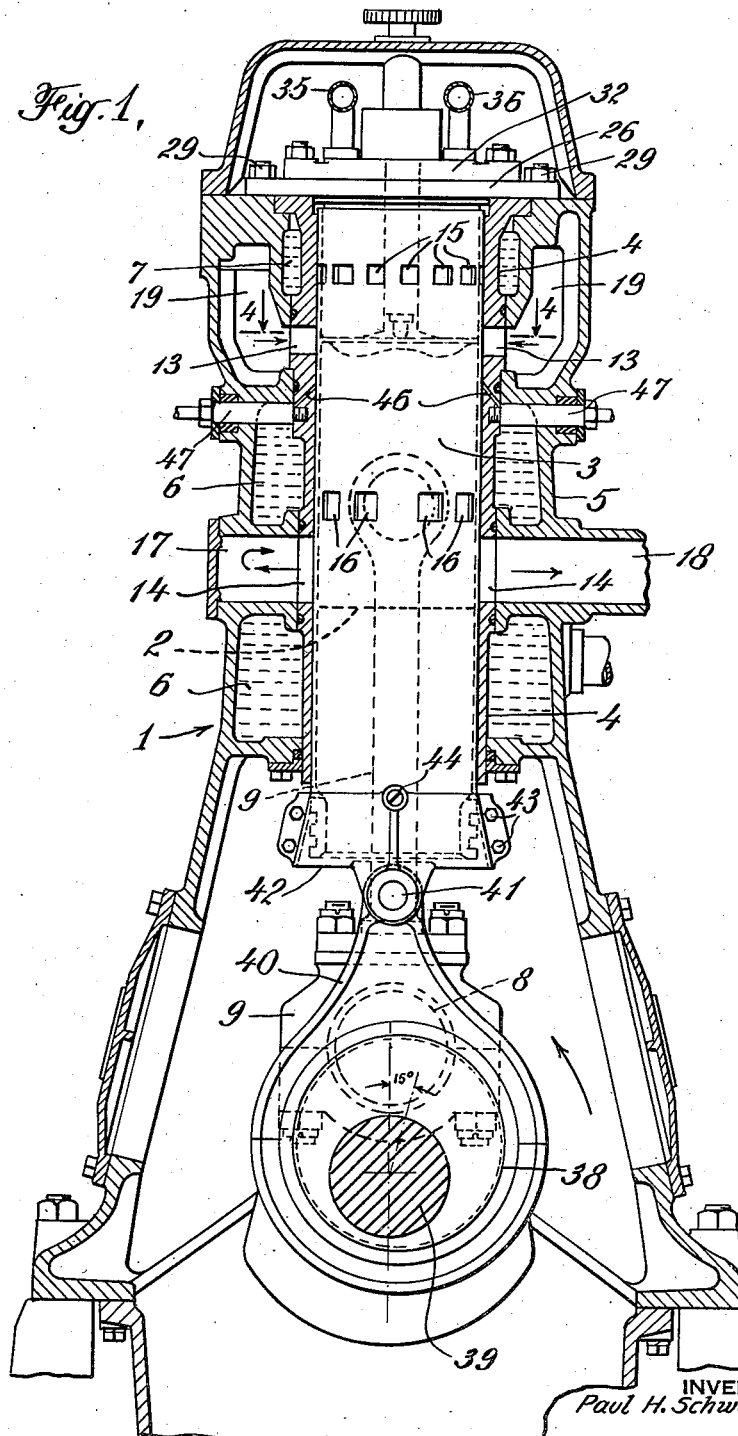
Fig. 1 is a view of the engine in vertical central section.

Figs. 6–10, inclusive, are diagrammatic sectional views illustrating the positions of the moving parts of the engine at certain angular positions of the engine crank taken from the diagram, Fig. 5; and Figs. 11 and 12 are views similar to Fig. 4 drawn to a somewhat smaller scale showing modifications of the arrangement of the air inlet ports.

Referring now to the accompanying drawings, it will be understood that any suitable number of cylinders may be employed. The engine 1 is of the single sleeve valve type, both the inlet and exhaust ports being controlled by suitable ports in the single sleeve 3. Piston 2 reciprocates within sleeve 3 which in turn reciprocates in the cylinder liner 4. The cylinder liner is preferably removably mounted in the engine frame. Cooling fluid spaces 6 and 7 are provided substantially surrounding the respective cylinders of the engine and through which water or other cooling fluid is circulated.

Piston 2 is arranged to drive the engine crank 8 by means of a connecting rod 9. The engine cylinder is provided with air admission, or inlet, ports 13 near its upper end and with exhaust ports 14 near its lower end. The opening and closing of the air admission ports 13 are controlled by a series of valve ports 15 near the upper end of sleeve valve 3. A somewhat similar series of valve ports 16 in sleeve valve 3 cooperate with exhaust ports 14, and the opening and closing of the exhaust ports are controlled by these ports in cooperation with the piston 2. The exhaust ports discharge into a passage 17 in the engine frame surrounding the cylinder and communicating with an exhaust pipe 18.

Scavenging and charging air is received by inlet ports 13 from air passageways 19 in the engine frame and extending along both sides of the engine at the upper portion of the cylinders. These air channels receive air from a pressure blower (not shown) which supplies air at suitable pressure for the scavenging and charging operations.

The inner, or upper, end of the engine cylinder is provided with a cylinder head 26 which extends downwardly into the cylinder for some distance to provide an annular recess above the air admission ports 13 and the combustion chamber 27 into which sleeve 3 extends. Stationary sealing rings 28 are provided on the outside of the lower portion of the cylinder head to coact with the inner surface of sleeve 3. As shown in Fig. 1, the cylinder head is flanged at the top so as to extend over the upper end of the cylinder liner 4, and is bolted to the engine frame by means of bolts 29 which hold both the cylinder head and the cylinder liner in place.

Fuel is injected into the cylinder by means of a fuel nozzle 30 mounted at the center of the cylinder head 26 and provided with a nozzle tip 31 which delivers the fuel in a spray at substantially the plane of the air admission ports 13.

Fuel is supplied to the nozzle 30 by means of an injection pump (not shown), arranged to cause the liquid fuel to be delivered in the form of a spray from the nozzle tips 31 in timed relation to the movement of the engine piston.

The valve sleeve 3 is reciprocated to open and close the air admission ports and the exhaust ports at the proper time by means of a pair of eccentrics 38 mounted on the engine main shaft 39 adjacent to crank 8. These eccentrics drive the sleeve through eccentric straps 40 pivoted at their upper ends at 41 to the diametrically opposite sides of a circular connecting member 42 which is secured to the lower end of sleeve 3. Member 42 is made in separable sections held together by bolts 43 and clamps around the lower end of the sleeve, and is held in fixed position longitudinally thereof by means of interfitting grooves on the sleeve and body of the connecting member respectively. The sleeve is held positively against turning with respect to connecting member 42 by means of screws 44 threaded into member 42 and having dowel ends entering apertures in the sleeve. Hence the valve ports 15 and 16 are maintained in alinement with the air inlet ports 13 and exhaust ports 14, respectively.

Figure 2:
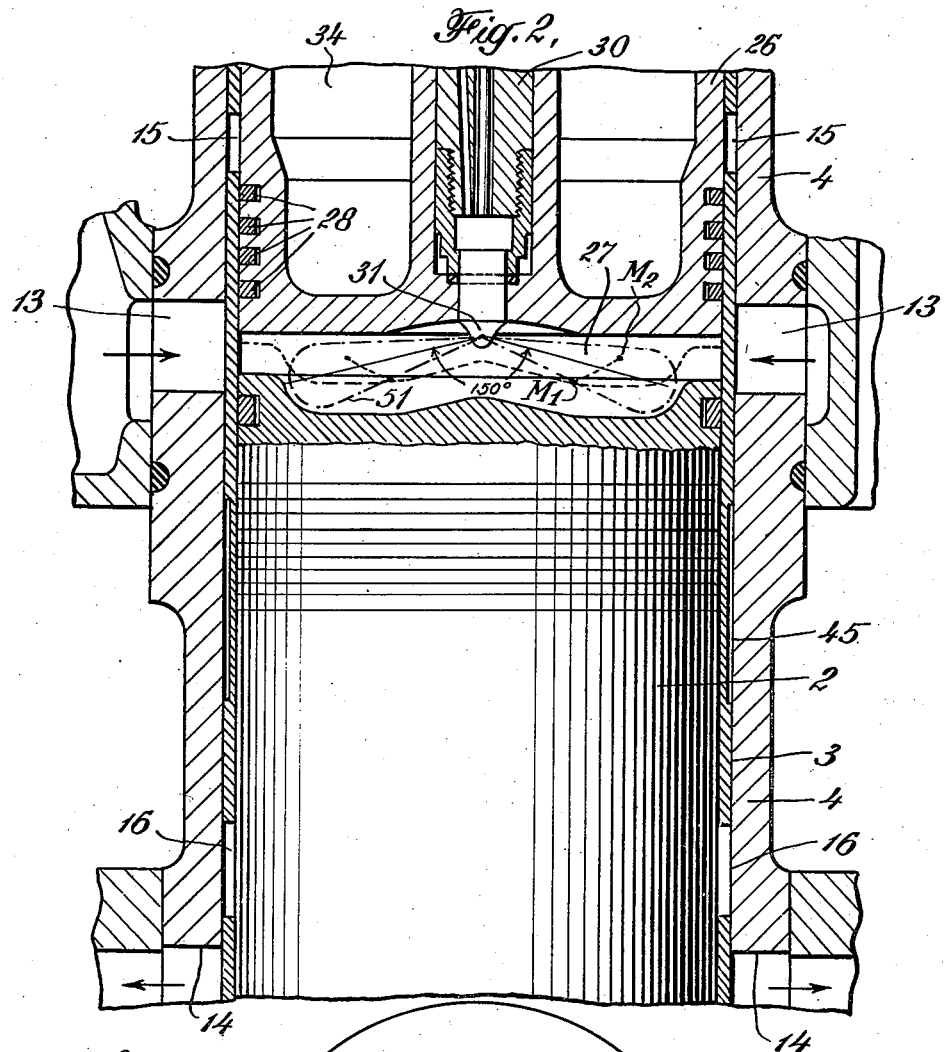
Fig. 2 is a fragmentary sectional view similar to the section of Fig. 1 showing the piston and upper portion of the cylinder, and particularly the combustion chamber, shortly after the commencement of fuel injection.

In order to facilitate lubrication of the outer surface of the sleeve 3 and the cylinder liner 4, the sleeve is exteriorly recessed, as indicated by numeral 45 in Fig. 2 to provide a lubricant retaining space. In addition, lubricant is delivered under pressure through upwardly inclined apertures 46 on opposite sides of the cylinder liner. These apertures communicate with fittings 47 which are connected with the pressure lubricating system 48 of the engine which is supplied with oil under pressure by means of a pump (not shown).

The angular position of the eccentrics 38 is slightly behind that of the main crank 8, and is preferably about 15° as indicated in Fig. 1 and also in Figs. 6–10, inclusive. Hence the motion of the piston is always in the same direction as that of the sleeve 3 except for a slight movement when the piston is at the top of its stroke, as indicated in Fig. 5, where curve P indicates the movement of the piston, curves I indicate the upper and lower boundaries of the inlet control ports 15, and curves E the boundaries of the exhaust control ports 16.

Starting with the piston at the commencement of an outward or power stroke, as shown in Figs. 1 and 2, all ports are closed and the piston advances downwardly on its working or outward stroke under the forces of expansion of the burning gases in the combustion chamber, the travel of the top of the piston with respect to the angular movement of the crank being indicated by curve P of Fig. 5. At the point where the crank has rotated through an angle of 105° the piston overtakes the upper edge of the exhaust control ports 16 of sleeve 3 which have also moved downwardly from the position shown in Figs. 1 and 2 until they are opposite the exhaust ports 14 of the cylinder liner, and hence exhaust commences to take place. This condition of affairs is indicated in diagrammatic view, Fig. 6.

While the engine crank is travelling from the 105° position to the 130° position, only the exhaust ports of the engine are open and the pressure within the cylinder drops nearly to atmospheric pressure. At the crank position of 130° the lower edges of the inlet ports 15 pass below the bottom of the cylinder head 26 and scavenging air under pressure commences to flow through the inlet ports 13 of the cylinder liner into the cylinder. The position of the moving parts of the engine at this point is indicated in Fig. 7.

Referring now to Fig. 4 which is a horizontal section through the inlet ports 13 of the cylinder liner 4 and the inlet control ports 15 of the sleeve 3, the air, in passing through these ports, is directed in a general tangential direction so that within the cylinder there is produced a rotating mass of air. The ports 13 and 15 are not directed axially of the cylinder but at right angles to the axis of the cylinder. This clean air advances downwardly in a compact body pushing the burned gases ahead of it. The rotatory movement of this air does not appear to promote mixing of the advancing air with the burned gases, but it has a pronounced effect in producing the combustible charge for the next working stroke of the engine, as will be presently seen.

As may be seen from Fig. 5 and also from Figs. 8 and 9, the exhaust ports remain open while the engine crank passes through the 180° or outer dead center position and until the crank reaches the 242° position, at which time the top of the piston passes above the upper edges of the exhaust control port 16 of the sleeve valve. During this period the scavenging action described above continues, the body of clean, fresh air advancing downwardly until it completely fills the cylinder, and some of the clean, scavenging air blows through the exhaust control ports 16 at the 180° crank position. Thus the burned gases from the previous power stroke have been completely displaced from the cylinder and the cylinder is filled with fresh, clean charging air. This air is substantially uncontaminated with the burned gases because of the fact that the scavenging air advances in a straight line in a compact mass like a plunger, the air being admitted through the inlet ports in such a manner as to avoid the formation of jets of incoming air projected into the burned charge undergoing exhaust.

It is to be remembered that the air plunger, as it advances lengthwise of the cylinder, is rotating rapidly, due to the tangential position of the air admission ports and this impartation of rotation to the mass of air within the cylinder continues during the supercharging period, that is to say, while the engine crank is rotating up to about an angle of 260°, as shown in Figs. 5 and 10, at which point the injection of the charging air under pressure through the tangential ports is stopped by the passing of the lower edges of the control ports 15 of sleeve 3 above the bottom of the cylinder head 26. Hence the impartation of the swirling motion to the air charge within the cylinder is maintained through substantially ½ of the inward rotation of the engine crank.

Moreover, inasmuch as the air inlet ports 13 are opposite the point of injection of the fuel spray from the tip of fuel nozzle 30, the charge of air remains in a rapidly rotating or whirling condition during the injection of the fuel. The injection of the fuel spray commences when the engine crank reaches an angular position of about 345°, or, in other words, at about 15° before the engine crank reaches the end of its instroke, or the inner dead center position. Thus from the time of cut-off of injection of the rotatory charging air to the time of commencement of fuel injection, the engine crank rotates through an angle of only about 100° and the whirling motion of the air within the cylinder persists to a remarkably high degree.

Figure 3:
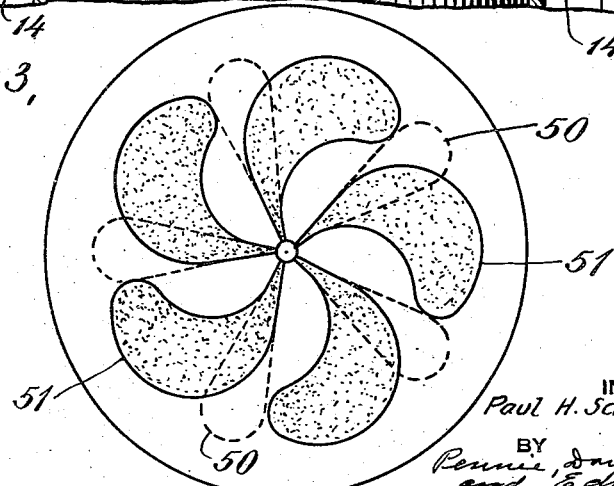
Fig. 3 is a view showing the fuel spray formation as produced by the injection of the spray into the mass of compressed air within the combustion space of Fig. 2.

The nozzle tip 31 of the fuel injection nozzle is provided with two or more openings arranged to produce a flat umbrella-shaped spray, that is to say, to direct the spray somewhat downwardly but laterally of the cylinder to a large extent. As shown in Fig. 3, the spray nozzle has five jets which, outside of the cylinder, that is to say, without the influence of the turbulence produced by the rotation or whirling of the air within the cylinder, produces a spray in five lobes 50 approximately as shown by the dotted lines in Fig. 3. When the nozzle is within the cylinder, however, and the injection takes place within this whirling mass of air, the lobes 50 are deflected and spread out into a spray formation about as indicated at 51. Unusual intermixing of the fuel spray and air is effected with the result that substantially complete combustion of all of the fuel injected takes place during the ensuing outward, or power, stroke of the piston.

The fuel is injected substantially in the plane of injection of the charging air and accordingly a spray angle of approximately 150°, as indicated in Fig. 2, is suitable. This also permits a good spray-fit to the combustion chamber to be obtained with a comparatively slight dishing of the piston crown, as indicated at 52, and permits the spray to penetrate into the compressed air mass center continuously during injection without coming into contact either with the piston top, the cylinder head wall or the walls of the valve sleeve 3.

As mentioned previously fuel injection into the combustion chamber commences to take place at about 15° before the top position of the piston indicated in dotted lines in Fig. 2 is reached. Between a crank angle of about 10° and the top position of the piston, the fuel spray is fully developed, as shown in Fig. 3, and in dot and dash lines in Fig. 2, and the dishing of the piston enables the fully developed fuel spray to follow the movement of the air mass center from the position $M_1$ to position $M_2$ as this center shifts during the final upward movement of the piston and without impinging on the piston top, cylinder wall or cylinder head.

Referring again to Fig. 4, it is intended that the surfaces 53 and 54 forming the walls of the several air admission or inlet ports 13 be positioned at such angles to a radial line from the center of the cylinder as to cause the ports to direct the air in such manner that the entire mass of air within the cylinder shall be rotated at as high a velocity as possible. Thus these port surfaces are made tangent to circles necessarily smaller than the diameter of the cylinder but larger than half the cylinder diameter. In Fig. 4 the side edges of the control ports 15 of sleeve 3 have been sloped to the same angle as surfaces 53 and 54 of ports 13 in the cylinder liner.

Inasmuch, however, as the sleeve 3 is a thin walled sleeve having a thickness, for example, of from about $\frac{1}{16}$ in. to about $\frac{3}{32}$ in., even for a cylinder diameter of 6 or more inches, a tangential flow of the air is still produced when the walls of the sleeve control ports are made radial as shown at 15a in the modified form of sleeve, 3a, shown in Fig. 12. In the manufacture of the sleeve it is somewhat simpler to construct the sleeve control ports as radial ports, or at least to make one edge of these ports radial, than to construct the sleeve with tangential inlet ports as shown in Fig. 4.

Although it is preferable to introduce the air tangentially, the advantages of the invention can be obtained to a degree with the ports arranged radially, as shown in the modification of Fig. 11. Here the ports 13b of the cylinder liner 4a are made radial as well as the control ports 15a of the valve sleeve 3a. Reasonably good scavenging is obtained because the air coming in through the side walls of the cylinder in equal volumes and at equal velocities from all of the several ports 13b forms a fairly compact mass of air at the inner end of the cylinder which gradually builds up and moves downward more or less plungerlike to displace the burned gases.

Good intermixing of the fuel supply and clean charging air is obtained, in as much as the fuel spray is injected substantially in the plane of air admission and the turbulence caused by the meeting of the angular streams of air is continued by the introduction of charging air during almost one-half of the inward stroke of the piston, and in as much as this turbulence persists during the compression and injection of the fuel spray. In fact, good persistence may be obtained even with the angularity of the sleeve driving eccentrics 38 shifted so as to cut off the admission of charging air at much less than half of the inward stroke of the piston, because by injecting the fuel spray in the plane of air admission the forces which impart turbulence are applied at the point lengthwise of the cylinder where the turbulence is to be utilized, and because the scavenging air flow is from the nozzle down instead of in the opposite direction.

It will be understood that in carrying out the invention changes may be made in the manner

I claim:

1. In a two-stroke cycle internal combustion engine, the combination of a cylinder having an air inlet port in its side wall near one end and an exhaust port near the opposite end, means for supplying air to the air inlet port, a sleeve reciprocating in the cylinder for controlling the inlet and exhaust ports, a piston reciprocating in the sleeve, a liquid fuel spray nozzle for producing a spray in a plane substantially passing through the air inlet port and substantially normal to the axis of the cylinder, the inlet port extending through the cylinder wall in a direction to cause the air to be introduced into the cylinder in a direction substantially normal to the axis thereof to produce a rotatory body of air within the cylinder into which the fuel spray is injected by the nozzle, and the nozzle being arranged to direct the fuel spray substantially radially into the rotating air.

2. In a two-stroke cycle internal combustion engine, the combination of a cylinder having in its side wall near one end a group of air inlet ports and near the opposite end a group of exhaust ports, means for supplying air to the air inlet ports, a sleeve reciprocating in the cylinder for controlling the inlet and exhaust ports, a piston reciprocating in the sleeve, a liquid fuel spray nozzle disposed axially of the cylinder for producing a spray in a plane substantially passing through the air inlet ports and substantially normal to the axis of the cylinder, the air inlet ports extending through the cylinder wall in a direction to cause the air to be introduced into the cylinder in a direction substantially normal to the axis thereof to produce rotation of the air within the cylinder about the cylinder axis, and the fuel spray being injected outwardly from the nozzle into such rotating air.

3. In a two-stroke cycle internal combustion engine, the combination of a cylinder having a piston reciprocating therein, a crank operated by the piston, the cylinder having in its side wall near its inner end a group of air admission ports and near its outer end a group of exhaust ports, means for supplying air to the air admission ports, a liquid fuel spray nozzle at the inner end of the cylinder for producing a spray in a plane substantially passing through the air admission ports and substantially normal to the axis of the cylinder, the air admission ports extending through the cylinder wall in a direction to cause the air to be introduced into the cylinder in a direction substantially normal to the axis to produce a rotatory body of air within the cylinder, and the fuel being injected into said rotatory body of air, and means for maintaining the introduction of air through the air admission ports during a substantial portion of the inward angular movement of said crank, so as to reduce the damping effect of the compression stroke on the rotating air.

4. In a two-stroke cycle internal combustion engine, the combination of a cylinder having a piston reciprocating therein, a crank operated by the piston, the cylinder having an air admission opening in its side wall near its inner end, and an exhaust opening near its outer end, means for supplying air to the air admission opening, a liquid fuel nozzle for injecting a fuel spray in a plane substantially passing through the air admission opening and substantially normal to the axis of the cylinder, the air admission opening extending through the cylinder wall in a direction to cause air to be introduced into the cylinder in a direction substantially normal to the axis thereof to produce a rotatory body of air within the cylinder into which the fuel spray is injected by the nozzle, and means for maintaining the introduction of air through the air admission opening during substantially one-half of the inward angular movement of the crank so as to reduce the damping effect of the compression stroke on the rotating air.

5. In a two-stroke cycle internal combustion engine, the combination of a cylinder having a plurality of air inlet ports in its side wall near its inner end and exhaust ports therein near its outer end, a liquid fuel spray nozzle arranged to produce a flat spray in a plane substantially passing through the air inlet ports and substantially normal to the axis of the cylinder, means for supplying air to the air inlet ports, said air inlet ports being tangentially positioned so as to produce a rotatory body of air within the cylinder, a sleeve reciprocating in the cylinder having spaced rows of ports for controlling respectively the inlet and exhaust ports, a piston reciprocating in the sleeve, a main crank and means for operatively connecting the piston therewith, and crank mechanism having its crank angle angularly behind the main crank for actuating the sleeve, whereby the injection of the air through the tangentially positioned ports is continued for a substantial portion of the inward angular movement of the main crank so as to reduce the damping effect of the compression stroke on the rotating air.

6. In a two-stroke cycle internal combustion engine, the combination of a cylinder having a plurality of air inlet ports in its side wall near its inner end and exhaust ports therein near its outer end, a liquid fuel spray nozzle disposed substantially centrally of the cylinder and arranged to produce a substantially flat spray in a plane substantially passing through the air inlet ports and substantially normal to the axis of the cylinder, means for supplying air to the air inlet ports, said air inlet ports being tangentially positioned so as to cause air to be introduced into the cylinder in a direction substantially normal to the axis thereof and thereby form a rotatory body of air within the cylinder, a sleeve reciprocating in the cylinder having spaced rows of ports for controlling respectively the inlet and exhaust ports, a piston reciprocating in the sleeve, a main crank and means for operatively connecting the piston therewith, and crank mechanism having its crank angle angularly behind the main crank for actuating the sleeve, whereby the injection of the air through the tangentially positioned ports is continued for a substantial portion of the inward angular movement of the main crank so as to reduce the damping effect of the compression stroke on the rotating air.

PAUL H. SCHWEITZER.